United States Patent [19]

Aposchanski et al.

[11] Patent Number: 4,599,694
[45] Date of Patent: Jul. 8, 1986

[54] HYBRID AIRFLOW MEASUREMENT

[75] Inventors: Alexander Aposchanski, Canton; Arthur J. Buglione, Garden City; James M. Coats, Ypsilanti, all of Mich.; Brian S. Edelman, Hiroshima, Japan

[73] Assignee: Ford Motor Company, Dearborn, Mich.

[21] Appl. No.: 618,021

[22] Filed: Jun. 7, 1984

[51] Int. Cl.⁴ .......................... G06F 15/20; F02D 5/02
[52] U.S. Cl. ............................... 364/431.05; 364/510; 364/564; 73/195; 73/198
[58] Field of Search ................... 364/431.05, 510, 564; 123/494, 478; 73/195, 198, 118 A

[56] References Cited

U.S. PATENT DOCUMENTS

| 3,803,912 | 4/1974 | Ohno | 73/195 |
| 3,871,214 | 3/1975 | Masaki et al. | 73/195 |
| 4,142,407 | 3/1979 | Kuroiwa et al. | 73/118 A |
| 4,348,727 | 9/1982 | Kobayaski et al. | 364/431.05 |

FOREIGN PATENT DOCUMENTS

| 0040223 | 3/1980 | Japan | 123/494 |
| 0096422 | 7/1980 | Japan | 73/195 |

Primary Examiner—Parshotam S. Lall
Attorney, Agent, or Firm—Peter Abolins; Keith L. Zerschling

[57] ABSTRACT

The amount of air entering an engine is determined by selecting the more accurate of two airflow determination means. One means measures a parameter characterizing airflow into the engine. Another means calculates airflow into the engine as a function of engine speed and air density.

2 Claims, 5 Drawing Figures

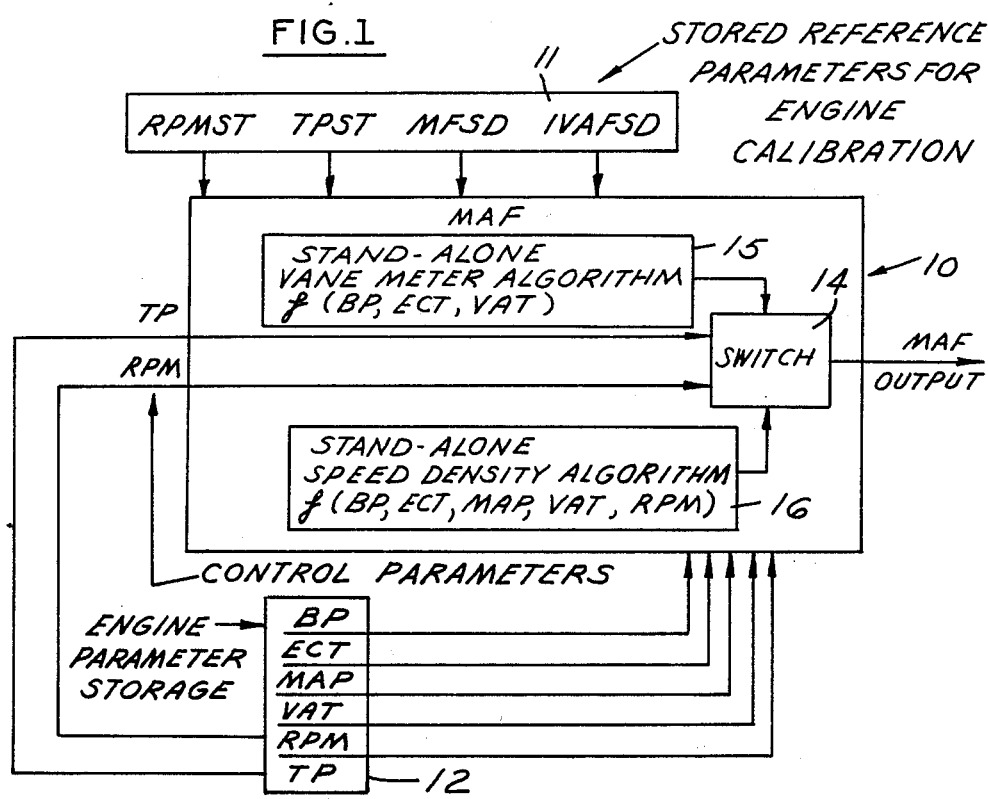
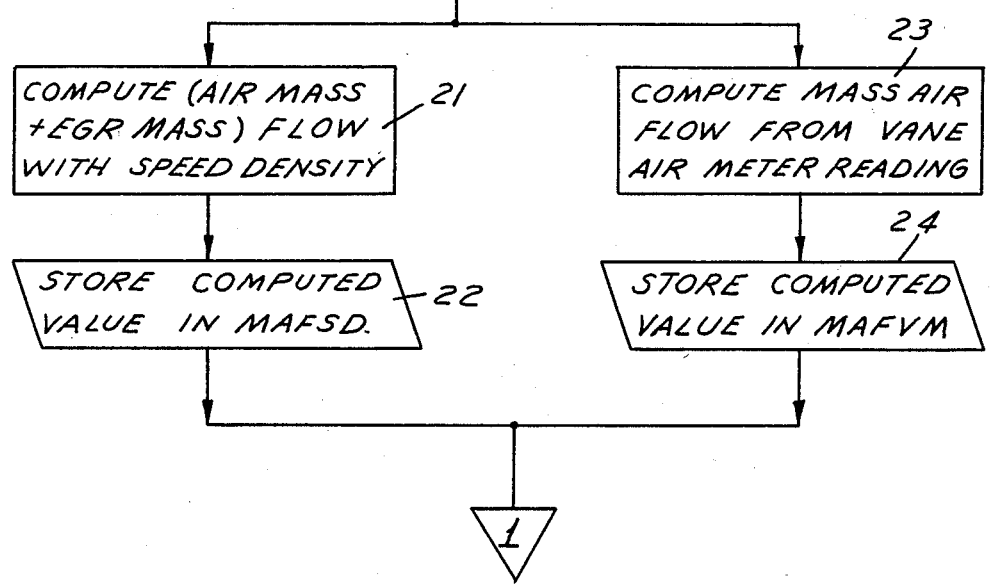
FIG.1
FIG.2

MODE SELECTION LOGIC FOR BASE AIR FLOW CALCULATION $VVAF_{(n)} = VVAF_{(n+1)} + FKMAF * (IVAF - VVAF_{(n-1)})$ $VMDEL = MAFSD - MAFVM$

HYSTERESIS FLIP-FLOP

| S (SET) | C (CLEAR) | Q-OUTPUT |
|---------|-----------|----------|
| 0 | 0 | NO CHANGE |
| 0 | 1 | 0 |
| 1 | 0 | 1 |
| 1 | 1 | 1 |

– – –

HYBRID AIRFLOW MEASUREMENT

BACKGROUND OF THE INVENTION

1. Technical Field

This invention relates to an engine control system.

2. Background Art

For better engine operation and for reducing undesirable exhaust gases, it is necessary to control the air fuel ratio. To control this air fuel ratio, a determination of air going into the engine is desirable.

Various airflow meters for measuring air intake into an internal combustion engine are known. For example, known types include a vane meter, a hot wire airflow meter and a vortex shedding airflow meter. Also known is a speed density calculation technique. In such a calculation, a measurement of pressure in the intake manifold is made, the air density is determined and the engine speed is determined to calculate the amount of air being inducted into the engine.

These known systems of airflow measurement have various drawbacks such as inaccuracy at extreme ranges of airflow, either very high or very low. These are some of the problems this invention overcomes.

DISCLOSURE OF THE INVENTION

An engine control system includes an airflow meter means and a calculation means. The airflow meter means senses a parameter characterizing airflow into the engine. The calculation means calculates airflow into the engine as a function of engine speed and air density. A selection means chooses either the output of the airflow meter or the calculation means to determine the amount of air entering the engine. By appropriately selecting one of the two airflow determination means, there results an improved accuracy of airflow measurement.

BRIEF DESCRIPTION OF THE DRAWINGS

FIG. 1 is a block diagram of an engine control system with an airflow determination in accordance with an embodiment of this invention;

FIGS. 2 and 3 are logic block diagrams of a mass airflow calculation in accordance with an embodiment of this invention;

BEST MODE FOR CARRYING OUT THE INVENTION

Figure 3:
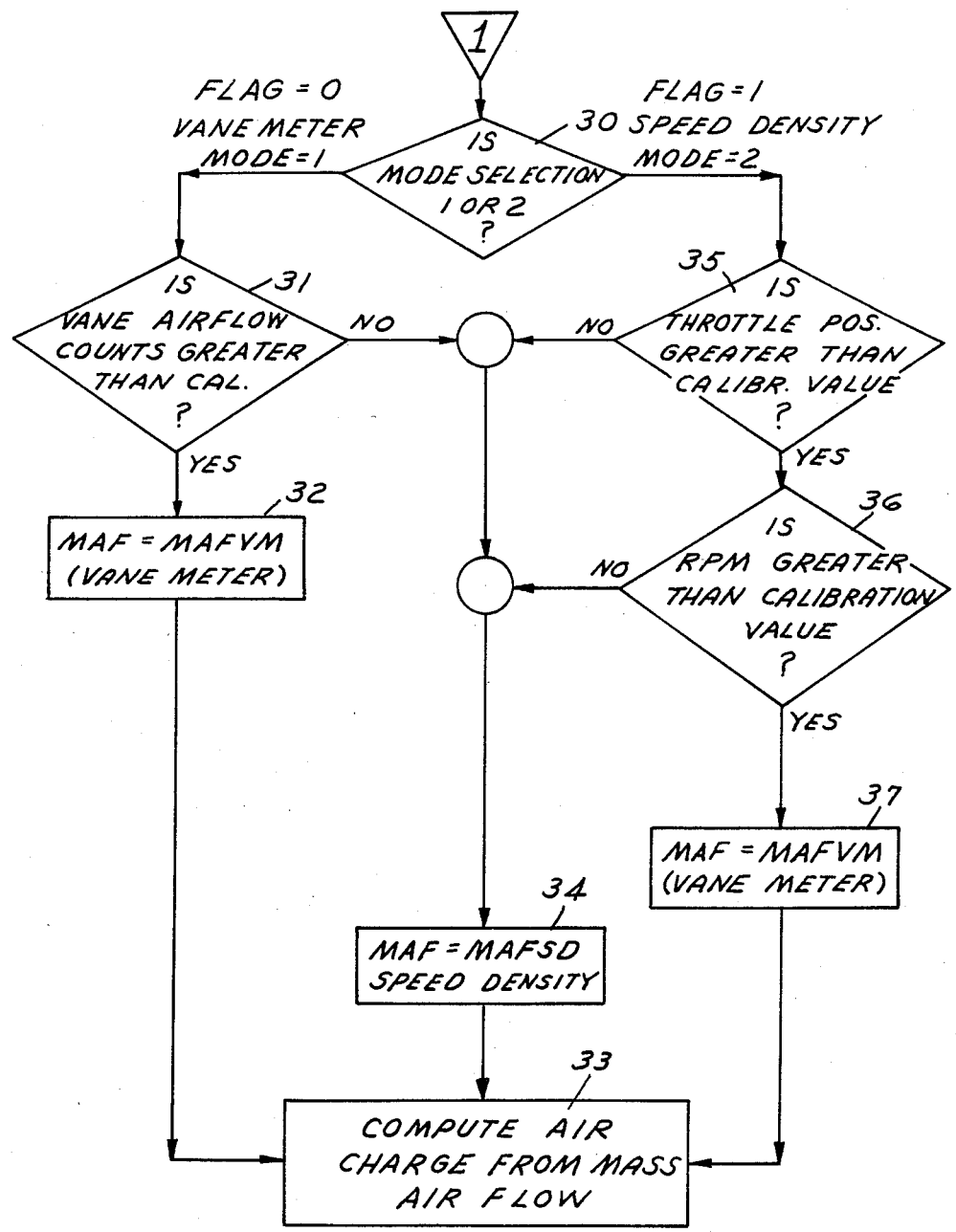

Referring to FIG. 1, a mass airflow computation apparatus 10 includes an engine calibration reference parameter storage 11 and an engine operating parameter storage 12 having outputs applied to apparatus 10. Storage 11 includes a magnitude of air flow detected by a vane air meter to enter speed density (IVAFSD), a magnitude of mass air flow to enter speed density (MAFSD), a preset threshold for throttle position (TPST), and a preset threshold for engine speed (RPMST). Storage 12 includes barometric pressure (BP), engine coolant temperature (ECT), manifold absolute pressure (MAP), temperature of air flow in the vane air meter (VAT), engine speed (RPM), and throttle position (TP). The air flow IVAFSD is expressed in counts which are a digital representation of an analog signal from the vane meter indicating magnitude of air flow.

A switch 14 has one input from an airflow meter indicator 15 and another input from speed density airflow calculator 16. The internal logic of switch 14 uses the inputs from airflow meter indicator 15 and speed density airflow calculator 16 to select between the two methods of mass air flow calculations. The logic of switch 14 is further discussed in connection with FIG. 3 and an implementation is shown in FIG. 4.

Referring to FIG. 2, a logic block flow diagram representing the switching action between airflow meter indicator 15 and speed density airflow calculator 16 is shown. Mass airflow calculation starts at a block 20 and goes through two parallel paths. A first path includes a block 21 wherein the air mass and exhaust gas recirculation mass flow is determined using speed-density equation. Block 22 indicates that the value computed in block 21 is stored. Analogously, in a second path, at a block 23 the mass air flow is computed from a vane air meter reading. At block 24, the value computed in block 23 is stored.

Figures 4, 5:
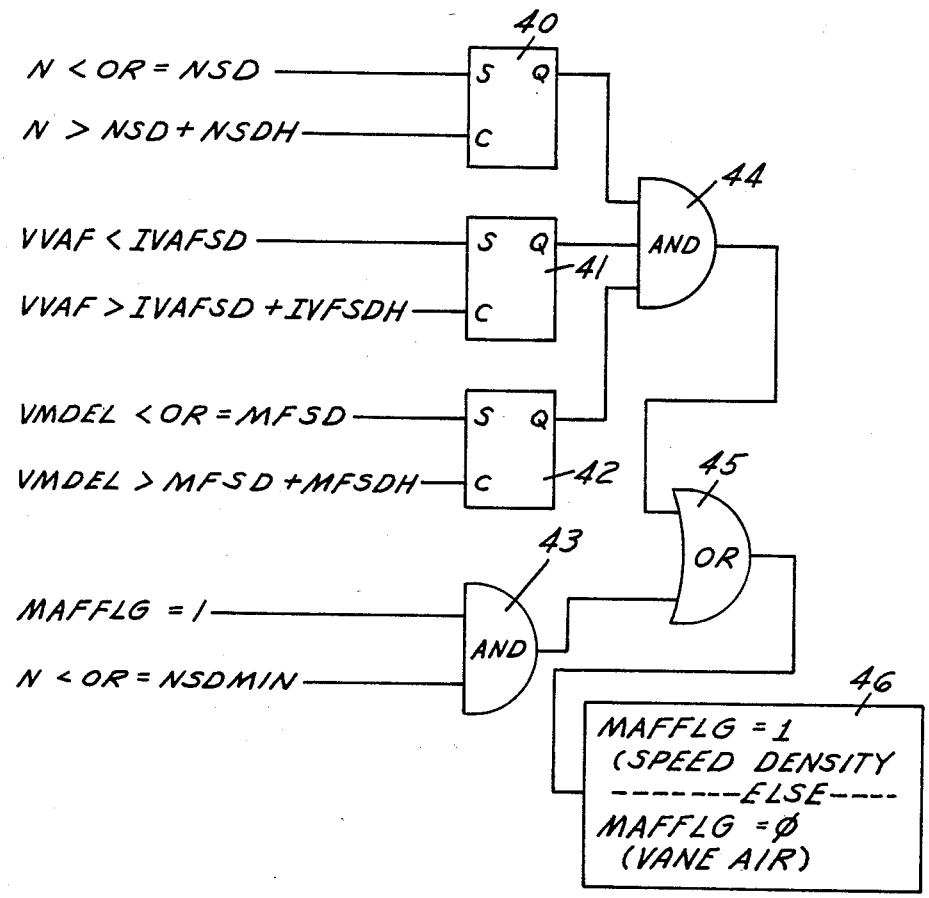
FIG. 4 is a schematic block diagram implementation of FIG. 3 showing the inputs and logic operations to determine airflow in accordance with an embodiment of this invention.
FIG. 5 is an output table for a hysteresis flip-flop.

Referring to FIG. 3, a selection between the airflow values determined by airflow meter indicator 15 and speed density airflow calculator 16 is made to determine the output of switch 14. More specifically, a block 30 indicates whether the selection mode is in Mode One, using the vane airflow measurement with an indicating flag equal to zero or in Mode Two, using the calculated speed-density airflow with an indicating flag equal to one. If Mode One is selected, the logic flow goes to a decision block 31 wherein the vane airflow count magnitude, representing magnitude of the airflow, is compared to a predetermined count threshold. If the count magnitude of the airflow is greater than the count threshold, the logic proceeds to a block 32 wherein the mass airflow is set equal to the mass airflow as determined by the vane meter. The logic flow then goes to a block 33 wherein there is a computation of the air charge from the mass airfow. If the vane airflow is less than or equal to the predetermined threshold, logic flow goes to a block 34 wherein the mass airflow is set equal to the computed mass airflow in accordance with the speed-density equation.

If the speed-density calculation mode, Mode Two, is selected in block 30, the logic flow goes to block 35 wherein the throttle position is compared to a predetermined threshold. If the throttle position is less than or equal to the predetermined threshold, the logic flow goes to block 34 wherein the mass air flow is set equal to the mass airflow as computed by speed density. If the throttle position is greater than the predetermined value, logic flow goes to a block 36 wherein the engine speed and RPM is compared to a predetermined threshold. If the engine speed is less than or equal to the predetermined threshold, logic flow goes again to block 34 wherein mass airflow is set equal to the speed density calculated mass airflow. If the engine speed is greater than the predetermined threshold, logic flow goes to a block 37 wherein the mass airflow is set equal to the mass airflow measured by the air meter. From block 37, the logic goes to block 33 wherein the air charge is computed from the mass airflow.

Referring to FIG. 4, a particular logic flow embodiment of the apparatus 10 of FIG. 1 using the logic flow of FIG. 3 is illustrated using hysteresis flip-flops, AND gates and OR gates. A hysteresis flip-flop has a set input and clear input and an output. An output truth table for a hysteresis flip-flop is shown as FIG. 5. In operation, when the set input of the flip-flop is true, regardless of the clear input level, the flip-flop sets and the output is true. The flip-flop remains set and the output stays true until the set input is false and the clear input is true. Then the flip-flop clears and the output is false.

Referring again to FIG. 4, a hysteresis flip-flop 40 has a set input which is one when the engine speed is less than or equal to an engine speed threshold necessary to select the speed-density calculation method of determining airflow. If engine speed is greater than the threshold, the input to the set is zero. The input to the clear input of flip-flop 40 is one when the engine speed is greater than the engine threshold speed to select a speed density calculation plus the hysteresis engine speed necessary to select airflow as measured by an air meter.

A hysteresis flip-flop 41 has a set input which is one when the averaged vane air meter counts are less than the number of vane air meter counts necessary to enter the speed density calculation. The input to the set of flip-flop 41 is zero when the averaged vane air meter counts are greater than or equal to the vane meter counts necessary to enter speed density calculation. The clear input of flip-flop 41 is one when the vane meter air counts are greater than the sum of the vane air meter counts necessary to enter speed density calculation plus the magnitude of counts for hysteresis to re-enter the vane airflow. If the vane meter counts are less than or equal to the sum of these two quantities, the input is zero. A hysteresis flip-flop 42 has a set input which is equal to one when the vane meter delta from the speed density calculation is less than or equal to the mass airflow computed by speed density. The input to the set of flip-flop 42 is zero if the vane meter delta is greater than the mass airflow computed by speed density. The input to the clear input of flip-flop 42 is one when the vane meter delta is greater than the sum of the breakpoints necessary to enter speed density calculation plus the hysteresis to re-enter the vane air meter calculation. Vane meter delta is a correction factor to adjust the valve of the vane air meter calculation to the value of the speed density calculation at the switch point from using the speed density calculation to using the vane air meter calculation. That is, the correction factor assumes that the speed density calculation is correct at the switch point. The value of vane meter delta is equal to the mass airflow calculated using the speed density method less the mass airflow calculated using the vane air meter method at the transition point between using the speed density calculation and the vane air meter calculation.

An AND gate 43 has a first input which is one when the mass airflow flag is set. The input is zero when the vane air meter is used and the input is one when the speed density calculation is used. A second input to AND gate 43 is one when the engine speed is less than or equal to the minimum engine speed to allow transition from the speed density calculation to the vane meter measurement in the mass airflow calculation.

The outputs of flip-flops 40, 41 and 42 are applied as inputs to an AND gate 44. The output of AND gate 44 and the output of AND gate 43 are applied as two inputs to an OR gate 45. The output of OR gate 45 is applied to a calculation block 46 wherein speed density is used to compute airflow if there is a one input and the vane air meter is used to compute airflow if there is a zero input.

In the vane meter mass air calculation indicated in block 15 of FIG. 1, the mass airflow determined by the vane air meter (MAFVM) is equal to the vane airflow correction factor (KFVAF) times the characteristic function of the vane airflow meter (FN013 (1VAF)) times the square root function of the barometric pressure (BP) divided by vane air temperature (VAT) in degrees Fahrenheit plus 460, the product being added to the sum of the vane meter offset (VMOFF) for calibration plus the adaptive vane meter offset (VMAOF).

$$MAFVM = (KFVAF)(FN103(1VAF))BP/(VAT + 460) + VMOFF + VMAOF$$

The speed density calculation of block 16 of FIG. 1 has engine parameter inputs of barometric pressure, engine coolant temperature, manifold absolute pressure and vane air temperature. This calculation is done to measure airflow into the engine at low levels which cannot be measured by the vane air meter. It is used for a closed throttle mode, mainly at idle.

$$MAFSD = \frac{(BASEMD)(MAP)(NBAR)}{ESTACT + 460} * FN326(ECT) *$$

$$(FN081(NBAR) * FN082(MAP) * FN305(ESTACT) + SDOFF + SDAMDF$$

wherein:
MAFSD—mass airflow calibration from speed density
BASEMD—speed density multiplier
MAP—manifold air pressure
NBAR—rolling average of engine revolutions per minute
ESTACT—estimated air charge temperature
FN081 (NBAR)—volumetric efficiency versus NBAR to modify MAFSD with volumetric efficiency
FN082 (MAP)—speed density multiplier versus MAP to modify MAFSD with volumetric efficiency
FN305 (ESTACT)—speed density multiplier versus ESTACT to modify MAFSD with ESTACT
FN326 (ECT)—speed density multiplier versus engine coolant temperature (ECT) to modify MAFSD with ECT
SDOFF—an offset term which is adjustable during calibration development, and fixed during production
SDAMOF—the adaptive speed density offset and is used to correct for variances in the volumetric efficiency from vehicle to vehicle or with the passage of time. The magnitude of SDAMMOF is restricted to minimize any impact of erroneous inputs to the SDAMOF calculation.

The base value of mass airflow is given by the first portion of the equation:

(BASEMD*MAP*NBAR)/(ESTACT+460)

when the airflow is deduced from the volume of air inducted per unit time and the density of the air inducted into the cylinders.

$$\frac{\text{Volume Inducted}}{\text{time}} = \frac{\text{(\# of Cylinder Events)}}{\text{Engine Revolution}} *$$

$$\frac{\text{(Volume of Air Inducted)}}{\text{Cylinder event}} * \text{(Avg. Engine RPM)}$$

The first two of these three terms are constants, and are contained in BASEMD. The third term is given as NBAR.

Density of Air Inducted into Cylinders =

$$\frac{\text{Density of Air at} \quad \text{(Manifold Air}}{\text{Standard Temp. \& Pressure} * \text{Pressure}}$$
$$\text{Absolute Air Temp.}$$

Air density is also a constant and is also included in BASEMD, so that BASEMD is a collection of constants grouped together.

Manifold Air Pressure is given by MAP, and the Absolute Air Temperature is given by (ESTACT+460).

The first portion of the speed density equation will not yield the actual value of mass airflow, however, because it assumes that the air in the intake manifold is pumped into the cylinders through the intake valves with 100% efficiency. Actually, there are significant pumping losses, and when the intake valve opens a residue of compressed exhaust gas (which was trapped inside the cylinder) rushes into the intake manifold and somewhat dilutes the combustion products.

The amount of these pumping losses (etc.) varies from one type of engine to another, and is dependent upon many parameters—including Engine Speed=NBAR
Manifold Air Pressure=MAP
Manifold Air Temperature≃ESTACT
Manifold Wall Temperature ≃ECT The speed density airflow calculation assumes that the dependence of the pumping losses can be expressed by an independent function of each of these variables (admittedly an approximation) and these four correction functions are given by

FN081 (NBAR)
FN082 (MAP)
FN305 (ESTACT)
FN326 (ECT)

Various modifications and variations will no doubt occur to those skilled in the art to which this invention pertains. For example, the particular approximations used in the calculation of the speed density equation may be varied from that disclosed herein. These and all other variations which basically rely on the teachings through which this disclosure has advanced the art are properly considered within the scope of this invention.

We claim:

1. An engine control system for determining airflow by selecting between a calculated airflow using engine speed and air density and a measured airflow using an air meter, comprising:

air flow meter means for sensing a parameter characterizing airflow into the engine;
calculation means for calculating airflow into the engine as a function of engine speed and air density;
selection means choosing either the output of said airflow meter or said calculation means to determine the amount of air entering the engine;
storage mens for storing engine operating parameters of engine speed;
reference means for storing a reference engine speed;
said selection means including:
a first hysteresis flip-flop circuit having a set input of "1" when engine speed is less than or equal to a first threshold engine speed for switching to using a calculated airflow from a measured airflow and having a set input of "0" when engine speed is greater than the first threshold engine speed;
said first hysteresis flip-flop having a clear input of "1" when engine speed is greater than the sum of the first threshold engine speed and a second threshold engine speed for switching to a measured airflow and having otherwise, when the engine speed is less than or equal, a clear input of "0";
a second hysteresis flip-flop having a set input of "1" when the average measured airflow is less than a threshold airflow for switching to using a calculated airflow and having otherwise, when measured airflow is greater than or equal, a set input of "0";
said second hysteresis flip-flop having a clear input of "1" when the average measured airflow is greater than the sum of the threshold airflow plus an additional hysteresis airflow for switching to use measured airflow, and having otherwise, when measured airflow is less than or equal, a clear input of "0";
a third hysteresis flip-flop having a set input of "1" when an air meter correction factor is less than or equal to a threshold calculated airflow for switching to using a calculated airflow and having otherwise, when the air meter correction factor is greater than, a set input of "0";
said third hysteresis flip-flop having a clear input when the air meter correction factor is greater than the sum of the threshold calculated airflow plus an additional hysteresis airflow for switching to using measured airflow and otherwise, when the air meter correction factor is less than or equal to, a clear input of "0";
a first AND gate having a first input of "1" when airflow is being determined by calculated airflow and "0" when air is being determined by measured airflow;
said first AND gate having a second input of "1" when engine speed is less than or equal to a minimum engine speed to allow transition from calculated to measured airflow, and otherwise, when engine speed is greater than a second input of "0";
a second AND gate having as three inputs the three outputs of said first, second and third hysteresis flip-flops;
an OR gate having as two inputs the output of, said first and second AND gates; and
said OR gate having an output indicating a selection of using calculated airflow when the OR output is "1" and using measured airflow when the OR output is "0".

2. An engine control system as recited in claim 1 wherein said air meter correction factor is the difference between the speed density calculated airflow and the measured airflow at a transition point from using speed density calculated airflow to using measured airflow as the determined airflow.

* * * * *